(12) United States Patent
St. Clair et al.

(10) Patent No.: US 7,141,621 B2
(45) Date of Patent: *Nov. 28, 2006

(54) GELS FROM CONTROLLED DISTRIBUTION BLOCK COPOLYMERS

(75) Inventors: David J. St. Clair, Houston, TX (US); Dale Lee Handlin, Jr., Houston, TX (US); Carl L. Willis, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 107 days.

This patent is subject to a terminal disclaimer.

(21) Appl. No.: 10/359,462

(22) Filed: Feb. 6, 2003

(65) Prior Publication Data
US 2003/0153681 A1    Aug. 14, 2003

Related U.S. Application Data

(60) Provisional application No. 60/355,210, filed on Feb. 7, 2002.

(51) Int. Cl.
*C08L 53/02* (2006.01)

(52) U.S. Cl. .................. 524/490; 525/271; 525/338

(58) Field of Classification Search ........... 525/271, 525/338; 524/490
See application file for complete search history.

(56) References Cited

U.S. PATENT DOCUMENTS

| | | | |
|---|---|---|---|
| 2,975,160 A | 3/1961 | Zelinski | |
| 3,149,182 A | 9/1964 | Porter | |
| 3,239,478 A | 3/1966 | Harlan, Jr. | |
| RE27,145 E | 6/1971 | Jones | |
| 3,595,942 A | 7/1971 | Wald et al. | |
| 3,600,250 A | 8/1971 | Evans | |
| 3,634,549 A | 1/1972 | Shaw et al. | |
| 3,670,054 A | 6/1972 | De La Mare et al. | |
| 3,700,633 A | 10/1972 | Wald et al. | |
| 4,073,831 A | 2/1978 | Tabana et al. | |
| 4,089,913 A | 5/1978 | Miki et al. | |
| 4,107,131 A | 8/1978 | Gergen et al. | |
| 4,367,325 A | 1/1983 | Takeuchi et al. | |
| 4,412,087 A | 10/1983 | Trepka | |
| 4,547,560 A | 10/1985 | Hattori et al. | |
| 4,578,429 A | 3/1986 | Gergen et al. | |
| 4,603,155 A | 7/1986 | Muramori et al. | |
| 4,898,914 A | 2/1990 | Gergen et al. | |
| 4,970,265 A | 11/1990 | Willis | |
| 5,075,377 A | 12/1991 | Kawabuchi et al. | |
| 5,191,024 A | 3/1993 | Shibata et al. | |
| 5,206,300 A | 4/1993 | Chamberlain | |
| 5,276,101 A | 1/1994 | Chamberlain et al. | |
| 5,290,875 A | 3/1994 | Moczygemba et al. | |
| 5,306,779 A | 4/1994 | Shibata et al. | |
| 5,346,964 A | 9/1994 | Shibata et al. | |
| 5,506,299 A | 4/1996 | Gelles et al. | |
| 5,516,831 A | 5/1996 | Pottick et al. | |
| 5,545,690 A | 8/1996 | Trepka et al. | |
| 5,603,155 A | 2/1997 | Satomi et al. | |
| 5,749,111 A | 5/1998 | Pearce | |
| 5,879,694 A | 3/1999 | Morrison et al. | |
| 5,905,097 A * | 5/1999 | Walther ................. | 521/82 |
| 5,910,546 A | 6/1999 | Trepka et al. | |
| 5,994,450 A | 11/1999 | Pearce | |
| 6,026,527 A | 2/2000 | Pearce | |
| 6,031,053 A | 2/2000 | Knoll et al. | |
| 6,107,411 A | 8/2000 | Toya et al. | |
| 6,197,889 B1 | 3/2001 | Knoll et al. | |
| 6,265,484 B1 | 7/2001 | Trepka et al. | |
| 6,265,485 B1 | 7/2001 | Trepka et al. | |
| 6,413,458 B1 | 7/2002 | Pearce | |
| 6,797,765 B1 | 9/2004 | Pearce | |
| 6,865,759 B1 | 3/2005 | Pearce | |
| 2003/0166776 A1* | 9/2003 | Wright et al. ............ | 525/88 |
| 2003/0176574 A1* | 9/2003 | St. Clair et al. .......... | 525/88 |
| 2003/0181584 A1* | 9/2003 | Handlin et al. ........... | 525/88 |
| 2003/0181585 A1* | 9/2003 | Handlin et al. ........... | 525/88 |
| 2003/0225209 A1* | 12/2003 | Handlin et al. ........... | 525/88 |
| 2004/0070187 A1* | 4/2004 | Chen ........................ | 280/742 |
| 2004/0146541 A1* | 7/2004 | Chen ........................ | 424/405 |
| 2005/0008669 A1* | 1/2005 | Chen ........................ | 424/401 |

FOREIGN PATENT DOCUMENTS

| | | |
|---|---|---|
| EP | 0 492 490 B1 | 8/1996 |
| EP | 0 877 038 A2 | 11/1998 |
| EP | 0 654 488 B1 | 1/1999 |
| EP | 0 398 758 B1 | 3/1999 |
| EP | 0 859 803 B1 | 12/1999 |
| EP | 0 927 210 B1 | 6/2000 |
| EP | 0 766 706 B1 | 12/2001 |
| GB | 2 138 009 A | 10/1984 |
| JP | 60-163910 | 8/1985 |
| JP | 61-291610 | 12/1986 |
| JP | 6-271717 | 9/1994 |
| JP | 7-149952 | 6/1995 |
| WO | 00/58380 | 10/2000 |

\* cited by examiner

*Primary Examiner*—Jeffrey Mullis
(74) *Attorney, Agent, or Firm*—Dean F. Vance; Michael A. Masse

(57) ABSTRACT

The present invention relates to gels prepared from novel anionic block copolymers of mono alkenyl arenes and conjugated dienes, and to blends of such block copolymers with other polymers. The block copolymers are selectively hydrogenated and have mono alkenyl arene end blocks and controlled distribution blocks of mono alkenyl arenes and conjugated dienes. The block copolymer may be combined with tackifying resins, oils and other components to form the gels of the present invention.

18 Claims, No Drawings

GELS FROM CONTROLLED DISTRIBUTION BLOCK COPOLYMERS

CROSS-REFERENCE TO RELATED APPLICATIONS

The present application claims the benefit of U.S. Provisional Patent Application Ser. No. 60/355,210, filed Feb. 7, 2002, entitled Novel Block Copolymers and Method for Making Same.

The present application is related to copending, commonly assigned U.S. patent application Ser. No. 10/359,981 entitled Novel Block Copolymers and Method for Making Same, now published as US2003/0176582 A1, commonly assigned U.S. patent application Ser. No. 10/359,906 entitled Polymer Modified Bitumen Compositions, now U.S. Pat. No. 6,759,454, copending, commonly assigned U.S. patent application Ser. No. 10/359,953 entitled Articles Prepared from Controlled Distribution Block Copolymers, now published as US2003/0166776 A1, copending, commonly assigned U.S. patent application Ser. No. 10/359,907 entitled Articles Prepared From Hydrogenated Controlled Distribution Block Copolymers, now published as US2003/0181585 A1, copending, commonly assigned U.S. patent application Ser. No. 10/359,927 entitled Adhesives and Sealants From Controlled Distribution Block Copolymers, now published as US2003/0176574 A1, all of which were filed Feb. 6, 2003 and copending, commonly assigned International Patent Application Serial Number PCT/NL03/00098 filed on Feb. 7, 2003 entitled Solvent-Free, Hot Melt Adhesive Composition Comprising a Controlled Distribution Block Copolymer, now published as WO 03/066769 A1, and copending, commonly assigned U.S. patent application Ser. No. 10/745,352 filed Dec. 12, 2003, entitled Gels from Controlled Distribution Block Copolymers, now published as US2004/0138371 A1, which is a continuation-in-part of U.S. patent application Ser. No. 10/359,462, and copending, commonly assigned U.S. patent application Ser. No. 10/681,608 filed Oct. 8, 2003 entitled Photopolymerizable Compositions and Flexographic Printing Plates Prepared from Controlled Distribution Block Copolymers, now published as US2004/0072951, all of which claim the benefit of U.S. Provisional Patent Application Ser. No. 60/355,210 filed Feb. 7, 2002.

BACKGROUND OF THE INVENTION

1. Field of the Invention

This invention relates to gels prepared from novel anionic block copolymers of mono alkenyl arenes and conjugated dienes.

2. Background of the Art

The preparation of block copolymers of mono alkenyl arenes and conjugated dienes is well known. One of the first patents on linear ABA block copolymers made with styrene and butadiene is U.S. Pat. No. 3,149,182. These polymers in turn could be hydrogenated to form more stable block copolymers, such as those described in U.S. Pat. No. 3,595,942 and U.S. Pat. No. Re. 27,145. Such polymers are broadly termed Styrenic Block Copolymers or SBC's.

SBC's have a long history of use as adhesives, sealants and gels. A recent example of such a gel can be found in U.S. Pat. No. 5,879,694. With the increased use of oil gels, the need for improved properties (expressed in terms of higher tensile strength and higher elongation) exist. Such gels may also be used, for example, as a water proofing encapsulant/sealant for electronics and in wire and cable applications.

Now a novel anionic block copolymer based on mono alkenyl arene end blocks and controlled distribution mid blocks of mono alkenyl arenes and conjugated dienes has been discovered and is described in copending, commonly assigned U.S. patent application Ser. No. 60/355,210, entitled "NOVEL BLOCK COPOLYMERS AND METHOD FOR MAKING SAME". Methods for making such polymers are described in detail in the above-mentioned patent application. Patentees have found that these new polymers will allow the preparation of improved oil gels. In particular, this invention comprises a new class of SBC's in which the polymer manufacturer can vary the compatibility characteristics of the rubber segment, resulting in improved oil gels.

SUMMARY OF THE INVENTION

In one aspect of the present invention we have discovered a novel oil gel composition comprising 100 parts by weight of at least one hydrogenated block copolymer having a controlled distribution block of a mono alkenyl arene and conjugated diene and 350 to 2000 parts by weight of an extender oil. The hydrogenated block copolymer has at least one polymer block A and at least one polymer block B wherein (a.) prior to hydrogenation each A block is a mono alkenyl arene homopolymer block and each B block is a controlled distribution copolymer block of at least one conjugated diene and at least one mono alkenyl arene; (b.) subsequent to hydrogenation about 0–10% of the arene double bonds have been reduced, and at least about 90% of the conjugated diene double bonds have been reduced; (c.) each A block having a number average molecular weight between about 3,000 and about 60,000 and each B block having a number average molecular weight between about 30,000 and about 300,000; (d.) each B block comprises terminal regions adjacent to the A blocks that are rich in conjugated diene units and one or more regions not adjacent to the A blocks that are rich in mono alkenyl arene units; (e.) the total amount of mono alkenyl arene in the hydrogenated block copolymer is about 20 percent weight to about 80 percent weight; and (f.) the weight percent of mono alkenyl arene in each B block is between about 10 percent and about 75 percent. The general configuration of the block copolymer is A-B, A-B-A, (A-B)$_n$, (A-B)$_n$-A, (A-B-A)$_n$X, (A-B)$_n$X or a mixture thereof, where n is an integer from 2 to about 30, preferably 2 to about 15, more preferably 2 to about 6, and X is coupling agent residue.

Such gels are used, for example, as a water proofing encapsulant/sealant for electronics and in wire and cable applications.

DETAILED DESCRIPTION OF THE PREFERRED EMBODIMENTS

The key component of the present invention is the novel block copolymer containing mono alkenyl arene end blocks and a unique mid block of a mono alkenyl arene and a conjugated diene. Surprisingly, the combination of (1) a unique control for the monomer addition and (2) the use of diethyl ether or other modifiers as a component of the solvent (which will be referred to as "distribution agents") results in a certain characteristic distribution of the two monomers (herein termed a "controlled distribution" polymerization, i.e., a polymerization resulting in a "controlled distribution" structure), and also results in the presence of certain mono alkenyl arene rich regions and certain conjugated diene rich regions in the polymer block. For purposes hereof, "controlled distribution" is defined as referring to a molecular structure having the following attributes: (1) terminal regions adjacent to the mono alkenyl arene homopolymer ("A") blocks that are rich in (i.e., having a greater than average amount of) conjugated diene units; (2) one or more regions not adjacent to the A blocks that are rich in (i.e., having a greater than average number of) mono alkenyl arene units; and (3) an overall structure having relatively low blockiness. For the purposes hereof, "rich in" is defined as greater than the average amount, preferably greater than 5% of the average amount. This relatively low blockiness can be shown by either the presence of only a single glass transition temperature (Tg) intermediate between the Tg's of either monomer alone, when analyzed using differential scanning calorimetry ("DSC") thermal methods or via mechanical methods, or as shown via proton nuclear magnetic resonance ("H-NMR") methods. The potential for blockiness can also be inferred from measurement of the UV-visible absorbance in a wavelength range suitable for the detection of polystyryllithium end groups during the polymerization of the B block. A sharp and substantial increase in this value is indicative of a substantial increase in polystyryllithium chain ends. In this process, this will only occur if the conjugated diene concentration drops below the critical level to maintain controlled distribution polymerization. Any styrene monomer that is present at this point will add in a blocky fashion. The term "styrene blockiness", as measured by those skilled in the art using proton NMR, is defined to be the proportion of S units in the polymer having two S nearest neighbors on the polymer chain. The styrene blockiness is determined after using H-1 NMR to measure two experimental quantities as follows:

First, the total number of styrene units (i.e. arbitrary instrument units which cancel out when ratioed) is determined by integrating the total styrene aromatic signal in the H-1 NMR spectrum from 7.5 to 6.2 ppm and dividing this quantity by 5 to account for the 5 aromatic hydrogens on each styrene aromatic ring.

Second, the blocky styrene units are determined by integrating that portion of the aromatic signal in the H-1 NMR spectrum from the signal minimum between 6.88 and 6.80 to 6.2 ppm and dividing this quantity by 2 to account for the 2 ortho hydrogens on each blocky styrene aromatic ring. The assignment of this signal to the two ortho hydrogens on the rings of those styrene units which have two styrene nearest neighbors was reported in F. A. Bovey, *High Resolution NMR of Macromolecules* (Academic Press, New York and London, 1972), chapter 6.

The styrene blockiness is simply the percentage of blocky styrene to total styrene units:

Blocky %=100 times (Blocky Styrene Units/Total Styrene Units)

Expressed thus, Polymer-Bd-S-(S)n-S-Bd-Polymer, where n is greater than zero is defined to be blocky styrene. For example, if n equals 8 in the example above, then the blockiness index would be 80%. It is preferred that the blockiness index be less than about 40. For some polymers, having styrene contents of ten weight percent to forty weight percent, it is preferred that the blockiness index be less than about 10.

This controlled distribution structure is very important in managing the strength and Tg of the resulting copolymer, because the controlled distribution structure ensures that there is virtually no phase separation of the two monomers, i.e., in contrast with block copolymers in which the monomers actually remain as separate "microphases", with distinct Tg's, but are actually chemically bonded together. This controlled distribution structure assures that only one Tg is present and that, therefore, the thermal performance of the resulting copolymer is predictable and, in fact, predeterminable. Furthermore, when a copolymer having such a controlled distribution structure is then used as one block in a di-block, tri-block or multi-block copolymer, the relatively higher Tg made possible by means of the presence of an appropriately-constituted controlled distribution copolymer region will tend to improve flow and processability. Modification of certain other properties is also achievable.

In a preferred embodiment of the present invention, the subject controlled distribution copolymer block has two distinct types of regions—conjugated diene rich regions on the ends of the block and a mono alkenyl arene rich region near the middle or center of the block. What is desired is a mono alkenyl arene/conjugated diene controlled distribution copolymer block, wherein the proportion of mono alkenyl arene units increases gradually to a maximum near the middle or center of the block and then decreases gradually until the polymer block is fully polymerized. This structure is distinct and different from the tapered and/or random structures discussed in the prior art.

Starting materials for preparing the novel controlled distribution copolymers of the present invention include the initial monomers. The alkenyl arene can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers. The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

As discussed above, the controlled distribution polymer block has diene rich region(s) adjacent to the A block and an arene rich region not adjacent to the A block, and typically near the center of the B block. Typically the region adjacent to the A block comprises the first 15 to 25% of the block and comprises the diene rich region(s), with the remainder considered to be arene rich. The term "diene rich" means that the region has a measurably higher ratio of diene to arene than the arene rich region. Another way to express this is the proportion of mono alkenyl arene units increases gradually along the polymer chain to a maximum near the middle or center of the block (if we are describing an ABA structure) and then decreases gradually until the polymer block is fully polymerized. For the controlled distribution block B the weight percent of mono alkenyl arene is between about 10 percent and about 75.

As used herein, "thermoplastic block copolymer" is defined as a block copolymer having at least a first block of a mono alkenyl arene, such as styrene and a second block of a controlled distribution copolymer of diene and mono alkenyl arene. The method to prepare this thermoplastic block copolymer is via any of the methods generally known for block polymerizations. The present invention includes as an embodiment a thermoplastic copolymer composition, which may be either a di-block, tri-block copolymer or multi-block composition. In the case of the di-block copolymer composition, one block is the alkenyl arene-based homopolymer block and polymerized therewith is a second block of a controlled distribution copolymer of diene and alkenyl arene. In the case of the tri-block composition, it comprises, as end-blocks the glassy alkenyl arene-based homopolymer and as a mid-block the controlled distribution copolymer of diene and alkenyl arene. Where a tri-block copolymer composition is prepared, the controlled distribution diene/alkenyl arene copolymer can be herein designated as "B" and the alkenyl arene-based homopolymer designated as "A". The A-B-A, tri-block compositions can be made by either sequential polymerization or coupling. In the sequential solution polymerization technique, the mono alkenyl arene is first introduced to produce the relatively hard aromatic block, followed by introduction of the controlled distribution diene/alkenyl arene mixture to form the mid block, and then followed by introduction of the mono alkenyl arene to form the terminal block. In addition to the linear, A-B-A configuration, the blocks can be structured to form a radial (branched) polymer, $(A-B)_nX$, or both types of structures can be combined in a mixture. Some A-B diblock polymer can be present but preferably at least about 30 weight percent of the block copolymer is A-B-A or radial (or otherwise branched so as to have 2 or more terminal resinous blocks per molecule) so as to impart strength.

It is also important to control the molecular weight of the various blocks. For an AB diblock, desired block weights are 3,000 to about 60,000 for the mono alkenyl arene A block, and 30,000 to about 300,000 for the controlled distribution conjugated diene/mono alkenyl arene B block. Preferred ranges are 5000 to 45,000 for the A block and 50,000 to about 250,000 for the B block. For the triblock, which may be a sequential ABA or coupled $(AB)_2 X$ block copolymer, the A blocks should be 3,000 to about 60,000, preferably 5000 to about 45,000, while the B block for the sequential block should be about 30,000 to about 300,000, and the B blocks (two) for the coupled polymer half that amount. The total average molecular weight for the triblock copolymer should be from about 40,000 to about 400,000, and for the radial copolymer from about 60,000 to about 600,000. These molecular weights are most accurately determined by light scattering measurements, and are expressed as number average molecular weights.

Another important aspect of the present invention is to control the microstructure or vinyl content of the conjugated diene in the controlled distribution copolymer block. The term "vinyl content" refers to a conjugated diene which is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. When referring to the use of butadiene as the conjugated diene, it is preferred that about 20 to about 80 mol percent of the condensed butadiene units in the copolymer block have 1,2 vinyl configuration as determined by proton NMR analysis, preferably about 30 to about 70 mol percent of the condensed butadiene units should have 1,2-vinyl configuration. This is effectively controlled by varying the relative amount of the distribution agent. As will be appreciated, the distribution agent serves two purposes—it creates the controlled distribution of the mono alkenyl arene and conjugated diene, and also controls the microstructure of the conjugated diene. Suitable ratios of distribution agent to lithium are disclosed and taught in U.S. Pat. No. Re. 27,145, which disclosure is incorporated by reference.

An important feature of the thermoplastic elastomeric di-block and tri-block polymers of the present invention, including one or more controlled distribution diene/alkenyl arene copolymer blocks and one or more mono alkenyl arene blocks, is that they have at least two Tg's, the lower being the combined Tg of the controlled distribution copolymer block which is an intermediate of its constituent monomers' Tg's. Such Tg is preferably at least about −60 degrees C., more preferably from about −40 degrees C. to about +30 degrees C., and most preferably from about −40 degrees C. to about +10 degrees C. The second Tg, that of the mono alkenyl arene "glassy" block, is preferably more than about 80 degrees C., more preferably from about +80 degrees C. to about +110 degrees C. The presence of the two Tg's, illustrative of the microphase separation of the blocks, contributes to the notable elasticity and strength of the material in a wide variety of applications, and its ease of processing and desirable melt-flow characteristics.

The block copolymer is selectively hydrogenated. Hydrogenation can be carried out via any of the several hydrogenation or selective hydrogenation processes known in the prior art. For example, such hydrogenation has been accomplished using methods such as those taught in, for example, U.S. Pat. Nos. 3,494,942; 3,634,594; 3,670,054; 3,700,633; and U.S. Pat. No. Re. 27,145. Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. In that case, the double bonds of both the conjugated diene and arene may be reduced by 90 percent or more.

In an alternative, the block copolymer of the present invention may be functionalized in a number of ways. One way is by treatment with an unsaturated monomer having one or more functional groups or their derivatives, such as carboxylic acid groups and their salts, anhydrides, esters, imide groups, amide groups, and acid chlorides. The preferred monomers to be grafted onto the block copolymers are maleic anhydride, maleic acid, fumaric acid, and their derivatives. A further description of functionalizing such block copolymers can be found in Gergen et al, U.S. Pat. Nos. 4,578,429 and in 5,506,299. In another manner the selectively hydrogenated block copolymer of the present invention may be functionalized by grafting silicon or boron containing compounds to the polymer as taught in U.S. Pat. No. 4,882,384. In still another manner, the block copolymer of the present invention may be contacted with an alkoxysilane compound to form silane-modified block copolymer. In yet another manner, the block copolymer of the present invention may be functionalized by reacting at least one ethylene oxide molecule to the polymer as taught in U.S. Pat. No. 4,898,914, or by reacting the polymer with carbon dioxide as taught in U.S. Pat. No. 4,970,265. Still further, the block copolymers of the present invention may be metallated as taught in U.S. Pat. Nos. 5,206,300 and 5,276,101, wherein the polymer is contacted with an alkali metal alkyl, such as a lithium alkyl. And still further, the block copolymers of the present invention may be functionalized by grafting sulfonic groups to the polymer as taught in U.S. Pat. No. 5,516,831.

One of the components used in the gels of the present invention is a polymer extending oil or plasticizer. Especially preferred are the types of oils that are compatible with the elastomeric segment of the block copolymer. While oils of higher aromatics content are satisfactory, those petroleum-based white oils having low volatility and less than 50% aromatic content are preferred. Such oils include both paraffinic and naphthenic oils. The oils should additionally have low volatility, preferable having an initial boiling point above about 500° F.

Examples of alternative plasticizers which may be used in the present invention are oligomers of randomly or sequentially polymerized styrene and conjugated diene, oligomers of conjugated diene, such as butadiene or isoprene, liquid polybutene-1, and ethylene-propylene-diene rubber, all having a weight average molecular weight in the range from 300 to 35,000, preferable less than about 25,000 mol weight.

The amount of oil or plasticizer employed varies from about 350 to about 2000 parts by weight per hundred parts by weight rubber, or block copolymer, preferably about 400 to about 1000 parts by weight.

Various types of fillers and pigments can be included in the adhesive formulations to pigment the adhesive and reduce cost. Suitable fillers include calcium carbonate, clay, talc, silica, zinc oxide, titanium dioxide and the like. The amount of filler usually is in the range of 0 to 30% weight based on the solvent free portion of the formulation, depending on the type of filler used and the application for which the adhesive is intended. An especially preferred filler is titanium dioxide.

The compositions of the present invention may be modified further with the addition of other polymers, oils, fillers, reinforcements, antioxidants, stabilizers, fire retardants, anti blocking agents, lubricants and other rubber and plastic compounding ingredients without departing from the scope of this invention. Such components are disclosed in various patents including U.S. Pat. Nos. 3,239,478; and 5,777,043, the disclosures of which are incorporated by reference.

Regarding the relative amounts of the various ingredients, this will depend in part upon the particular end use and on the particular block copolymer that is selected for the particular end use. Table A below shows some notional compositions that are included in the present invention. "CD Polymer" refers to the controlled distribution polymer of the present invention:

TABLE A

Applications, Compositions and Ranges

| Application | Ingredients | Composition, Parts by weight |
|---|---|---|
| Oil gel | CD Polymer | 100 |
|  | Oil | 300 to 2000 |

EXAMPLES

The following examples are provided to illustrate the present invention. The examples are not intended to limit the scope of the present invention and they should not be so interpreted. Amounts are in weight parts or weight percentages unless otherwise indicated. The test methods used in the examples are American Society for Testing Materials (ASTM) test methods, and the following specific method was used:

| Melt Viscosity | ASTM D-3236 |
|---|---|
| Ring & Ball Softening Point | ASTM D-36 |
| Tensile Properties | ASTM D-412 |

Example 1

Controlled distribution block copolymers of the present invention were prepared according to the process disclosed in copending patent application Ser. No. 60/355,210 referenced above, including it's continuing application filed concurrently. The polymers were selectively hydrogenated ABA block copolymers where the A blocks were polystyrene blocks and the B block prior to hydrogenation was a styrene butadiene controlled distribution block having terminal regions that are rich in butadiene units and a center region that was rich in styrene units. The polymers are shown in Table 1 below. Step I MW is the molecular weight of the first A block, Step II MW is the molecular weight of the AB blocks and Step III MW is the molecular weight of the ABA blocks. The polymers were hydrogenated such that greater than about 95% of the diene double bonds have been reduced.

TABLE 1

Controlled Distribution Polymers

| Polymer Number | Step I MW(k) | Step II MW(k) | Step III MW(k) | % Styrene in Mid Block B | Styrene Blockiness | 1,2-BD (%) | PSC (%) |
|---|---|---|---|---|---|---|---|
| 24 | 29 | 159 | 188 | 39.7 | 9 | 35 | 58 |
| 25 | 9.1 | 89 | 97 | 25.7 | 0 | 36 | 39 | where "MW(k)" = molecular weight in thousands and "PSC(%)" = wt % of styrene in the final polymer. "Styrene Blockiness" is for just the B block.

Accordingly, Polymer #24 is a linear ABA tri-block copolymer having number average block mol weights of 29,000-130,000-29,000 and Polymer #25 is a linear ABA tri-block copolymer having number average block mol weights of 9,100-80,000-9,100.

Example 2

Example 2 shows the use of the novel CD Polymer #25 in oil gels. Samples #2-1, 2-2 and 2-3 show the properties of gels based on the conventional hydrogenated SBC, SEBS #1. SEBS #1 is a selectively hydrogenated SBS block copolymer having polystyrene end blocks of about 10,000 and a hydrogenated polybutadiene mid block of about 50,000. Results show that as the polymer content increases, softening point and tensile properties improve and melt viscosity increases. Samples #2-4, 2-5 and 2-6 show that the same trend is found using CD Polymer #25. Surprisingly, however, CD Polymer #25 gives the gel higher tensile strength and higher elongation than the conventional hydrogenated polymer.

TABLE 2

| Composition, % w | #2-1 | #2-2 | #2-3 | #2-4 | #2-5 | #2-6 |
|---|---|---|---|---|---|---|
| DRAKEOL 34 | 90 | 85 | 80 | 90 | 85 | 80 |
| SEBS #1 | 10 | 15 | 20 |  |  |  |

TABLE 2-continued

| Composition, % w | #2-1 | #2-2 | #2-3 | #2-4 | #2-5 | #2-6 |
|---|---|---|---|---|---|---|
| CD Polymer #25 | | | | 10 | 15 | 20 |
| Melt Vis @ 149° C., cps | 185 | 750 | 3,870 | 235 | 2210 | 17,500 |
| R&B Softening Pt, ° C. | 85 | 96 | 106 | 89 | 104 | 117 |
| Tensile Strength, psi | too soft | 17.0 | 51 | too soft | 18.5 | 79 |
| Elongation @ Break, % | | 280 | 540 | | 460 | 760 |

Example 3

In example 3, oil gels were made with higher molecular weight polymers, a conventional hydrogenated SEBS #2 and the CD polymer #24. SEBS #2 is a selectively hydrogenated SBS block copolymer having polystyrene end blocks of about 30,000 and a hydrogenated polybutadiene mid block of about 130,000. Results show that as the polymer content increases, softening points and melt viscosities increase. The softening points of samples #3-3 and 3-4 made using CD Polymer #24 are higher than softening points of samples #3-1 and 3-2 made using SEBS #2. However, melt viscosities of the gels made with CD Polymer #24 are also higher than those made with the conventional hydrogenated polymer SEBS #2.

TABLE 3

| Composition, % w | #3-1 | #3-2 | #3-3 | #3-4 |
|---|---|---|---|---|
| DRAKEOL 34 | 95 | 92.5 | 95 | 92.5 |
| SEBS #2 | 5 | 7.5 | | |
| CD Polymer #24 | | | 5 | 7.5 |
| Melt Vis @ 149° C., cps | 5950 | 49700 | 2300 | 133000 |
| Melt Vis @ 177° C., cps | 260 | 1140 | 905 | 12300 |
| R&B Softening Pt, ° C. | 110 | 124 | 116 | 136 |

What is claimed:

1. An oil gel composition comprising 100 parts by weight of at least one hydrogenated block copolymer and from about 400 to about 2000 parts by weight of an extending oil, wherein said hydrogenated block copolymer has at least one polymer block A and at least one polymer block B, and wherein:
   a. prior to hydrogenation each A block is a mono alkenyl arene homopolymer block and each B block is a controlled distribution copolymer block of at least one conjugated diene and at least one mono alkenyl arene;
   b. subsequent to hydrogenation about 0–10% of the arene double bonds have been reduced, and at least about 90% of the conjugated diene double bonds have been reduced;
   c. each A block having a number average molecular weight between about 3,000 and about 60,000 and each B block having a number average molecular weight between about 20,000 and about 300,000;
   d. each B block comprises terminal regions adjacent to the A blocks that are rich in conjugated diene units and one or more regions not adjacent to the A blocks that are rich in mono alkenyl arene units;
   e. the total amount of mono alkenyl arene in the hydrogenated block copolymer is about 20 percent weight to about 80 percent weight; and
   f. the weight percent of mono alkenyl arene in each B block is between about 10 percent and about 75 percent.

2. The oil gel composition according to claim 1 wherein said mono alkenyl arene is styrene and said conjugated diene is selected from the group consisting of isoprene and butadiene.

3. The oil gel composition according to claim 2 wherein said conjugated diene is butadiene, and wherein about 20 to about 80 mol percent of the condensed butadiene units in block B have 1,2-configuration.

4. The oil gel composition according to claim 3 wherein the styrene blockiness of the block B is less than about 40 mol percent.

5. The oil gel composition according to claim 4 wherein the polymer is an ABA polymer and each block B has a center region with a minimum ratio of butadiene units to styrene units.

6. The oil gel composition according to claim 3 wherein the weight percent of styrene in each B block is between about 10 percent and about 30 percent, and the styrene blockiness index of each block B is less than about 10 percent, said styrene blockiness index being defined to be the proportion of styrene units in the block B having two styrene neighbors on the polymer chain.

7. The oil gel composition according to claim 3 wherein said hydrogenated block copolymer has a general configuration AB, ABA, $(A-B)_n$, $(A-B)_nA$, $(A-B)_nX$ or mixtures thereof where n is an integer from 2 to about 30, and X is the coupling agent residue.

8. The oil gel composition according to claim 7 wherein said hydrogenated block copolymer is a linear hydrogenated ABA styrene/butadiene block copolymer having a total number average molecular weight of about 80,000 to about 140,000.

9. The oil gel composition according to claim 8 wherein said extending oil is a paraffinic processing oil.

10. The oil gel composition according to claim 9 wherein the amount of extending oil is between about 400 and about 1000 parts by weight.

11. The oil gel composition according to claim 8 wherein said extending oil is a naphthenic oil.

12. The oil gel composition according to claim 8 wherein said extending oil is selected from the group consisting of oligomers of randomly or sequentially polymerized styrene and conjugated diene, oligomers of conjugated diene, liquid polybutene-1 and ethylene-propylene-diene rubber.

13. The oil gel composition according to claim 12 wherein said oligomers of conjugated dienes comprise butadiene or isoprene.

14. The oil gel composition according to claim 12 wherein said extending oil has a weight average molecular weight from 300 to 35,000.

15. The oil gel composition according to claim 1 further comprising a filler or pigment.

16. The oil gel composition according to claim 15 wherein said filler is selected from the group consisting of calcium carbonate, clay, talc, silica, zinc oxide and titanium dioxide.

17. The oil gel composition according to claim 1 wherein said extending oil has an aromatic content less than 50%.

18. The oil gel composition according to claim 1 wherein said extending oil has an initial boiling point above about 500° F.

* * * * *